United States Patent [19]

Takahashi et al.

[11] Patent Number: 5,348,794
[45] Date of Patent: Sep. 20, 1994

[54] MONOAXIALLY ORIENTED MULTILAYERED PACKAGING MATERIAL

[75] Inventors: Tomonori Takahashi, Chigasaki; Masato Kimura; Masataka Oka, both of Fujisawa; Isamu Ogasawara, Kawasaki, all of Japan

[73] Assignee: Nippon Petrochemicals Company, Limited, Tokyo, Japan

[21] Appl. No.: 110,492

[22] Filed: Aug. 23, 1993

Related U.S. Application Data

[63] Continuation of Ser. No. 768,604, Sep. 30, 1991, abandoned.

[30] Foreign Application Priority Data

Jan. 30, 1990 [JP] Japan .................................. 2-20307

[51] Int. Cl.$^5$ ........................ B29C 55/18; B32B 27/34
[52] U.S. Cl. ............................. 428/213; 264/210.2; 264/280; 264/288.4; 428/215; 428/474.4; 428/474.7; 428/475.2; 428/475.8; 428/476.1; 428/476.3; 428/910
[58] Field of Search .................... 428/213, 215, 474.4, 428/474.7, 475.2, 475.8, 476.1, 476.3, 910; 264/210.2, 280, 288.4

[56] References Cited

U.S. PATENT DOCUMENTS 4,818,592 4/1989 Ossian ............................... 428/216

FOREIGN PATENT DOCUMENTS

| | | | |
|---|---|---|---|
| 57-176126 | 10/1982 | Japan ............................. | B29D 7/24 |
| 58-78727 | 5/1983 | Japan ............................. | B29D 7/20 |
| 59-106964 | 6/1984 | Japan ............................. | B32B 27/28 |
| 61-53218 | 11/1986 | Japan ............................. | A61K 35/20 |

*Primary Examiner*—D. S. Nakarani
*Attorney, Agent, or Firm*—Scully, Scott, Murphy & Presser

[57] ABSTRACT

A multilayered packaging material having good piercing resistance and tearability and being excellent in appearance, transparency and so forth, can be produced by orienting multilayered structure which is composed of a polyamide resin layer and other thermoplastic resin layer(s) at a monoaxially stretching ratio of 1.5- to 7.0-fold in such a manner that the thickness of the polyamide resin layer is 3 to 30 μm and the thickness(es) of the other thermoplastic resin layer(s) is (are) at least twice as much as that of the polyamide resin layer.

6 Claims, No Drawings

MONOAXIALLY ORIENTED MULTILAYERED PACKAGING MATERIAL

This is a continuation of copending application Ser. No. 768,604 filed on Sep. 30, 1991, now abandoned.

TECHNICAL FIELD

This invention relates to a multilayered packaging material having good piercing resistance and tearability and being excellent in gas impermeability, transparency, gloss and so forth, and also relates to a method of producing the packing material.

BACKGROUND ART

In the conventional art, multilayered packaging materials with double or more layers have been proposed. They are composed of polyamide resin and polyolefins such as polyethylene or other highly gas-impermeable resins such as ethylene-vinyl alcohol copolymer, polyvinylidene chloride and polyacrylonitrile. The multilayered packaging materials of this kind have excellent combined characteristics of piercing resistance, thermal resistance, low-temperature resistance and gas impermeability which are inherent in the polyamide resin, moisture impermeability and heat-sealable property which are inherent in the polyolefin resin and excellent gas impermeability which is inherent in ethylene-vinyl alcohol copolymer. Thus they have been widely used for food packaging, especially as bags for meat, pickles, cakes, sauces, soups and the like.

The multilayered packaging materials made of the above combination are produced by methods of coextrusion, dry lamination or the like. As for the kinds of the packaging materials, there are non-oriented materials which are obtained by co-extrusion and wholly or partially oriented multilayered packaging materials which are made by biaxially orienting a single resin such as polyamide, polypropylene, ethylene-vinyl alcohol copolymer or polyethylene-terephthalate and then joining the oriented resins together by using a method of dry lamination or extrusion lamination.

In these conventional multilayered packaging materials, non-oriented type is characterized by the excellent piercing resistance which is inherent in the polyamide resin. However, the material is hardly torn, so that it poses a problem, for example, in the difficulty to be opened in the case of the widely used packaging bags.

As for the packaging materials obtained by laminating biaxially oriented resins, they have good tearability, however, the direction of tearing cannot be settled. Furthermore, when the packaging bags are made by laminating with a sealant resin layer, their tearability is impaired and the easily opening property is not good.

As a result of investigations carried out by the inventors to solve the above disadvantages in the conventional arts, the present invention has been accomplished.

DISCLOSURE OF INVENTION

This invention relates to a monoaxially oriented multilayered packaging material which is produced by orienting multilayered structure composed of at least two layers of polyamide resin layer and other thermoplastic resin layer(s) with the stretching ratio of 1.5- to 7-fold. The thickness of the polyamide resin layer is 3 to 30 μm and the thickness(es) of the other thermoplastic resin layer(s) is (are) at least twice as large as the thickness of the polyamide resin layer.

The other invention relates to a method of producing a monoaxially oriented multilayered packaging material which is characterized in that a multilayered material composed of at least two layers of a polyamide resin layer and other thermoplastic resin layer(s) are monoaxially rolled at the rolling ratio of 1.5- to 7.0-fold and in the temperature range from the lowest melting point of the component resins to the temperature lower by 70° C. than said melting point, wherein the thickness of the polyamide resin layer is 3 to 30 μm and the thickness(es) of other thermoplastic resin layer(s) is (are) at least twice as large as that of the polyamide resin layer.

The present invention will be described in more detail in the following.

A multilayered packaging material of the invention is a film composed of at least two layers of a polyamide resin layer and the other resin layer. The polyamide resin is generally hardly torn, while the other resin such as high density polyethylene or polypropylene becomes very tearable in the direction of orientation when it is monoaxially oriented. The thicknesses of the component resin layers must be determined in such a manner that the thickness of the polyamide resin layer is 3 to 30 μm and the thickness(es) of other thermoplastic resin layer(s) such as high density polyethylene is (are) at least twice as large as that of the polyamide resin layer.

When the thickness of the polyamide resin layer is smaller than 3 μm, the multilayered packaging material cannot show the foregoing characteristic of the polyamide resin. When the thickness is larger than 30 μm, the tearability which is a main feature of this invention is insufficient.

The thickness of other thermoplastic resin layer has a large effect on the tearability of a multi-layered packaging material.

The polyamide resin have various characteristics as described above depending on its molecular structure. With regard to the tearability, the resin cannot be changed to have good tearability even when it is stretched in one direction to some extent, for example, to about 5-fold. However, the present inventors have found out that the polyamide resin can be changed to show the tearability in one direction by combining the polyamide resin with other resins having good tearability in the form of multilayered structure and orienting monoaxially.

More particularly, only when the thickness of the polyamide resin layer is restricted to 3 to 30 μm and the thickness of other thermoplastic resin layer or layers are at least twice as large as that of the polyamide resin layer, the multilayered packaging material provides excellent tearability. If the thickness of other thermoplastic resin layer is smaller than twice that of the polyamide resin layer, satisfactory tearability cannot be obtained even when the laminate is oriented monoaxially to about 7-fold.

In view of the tearability, the total thickness of a monoaxially oriented multilayered packaging material of this invention is preferably up to 200 μm, and more preferably up to 150 μm.

Monoaxial orientation is inevitable to provide the tearability. The ratio of stretching in this invention may be in the range of 1.5- to 7-fold, preferably 2- to 6-fold. When the stretching ratio is lower than 1.5-fold, the multi-layered packaging material cannot have sufficient tearability. To the contrary, when the ratio is higher than 7-fold, the degree of thermal shrinkage is large, so that heat-sealed portions are creased assuming extremely undesirable appearance when bags are made by heat-sealing with using such a material.

The above-mentioned orientation includes the ordinary roll stretching, monoaxial stretching with close rolls, monoaxial stretching on curved heating plate and rolling. The rolling is most preferable, because uneven stretching is not cause to occur even in a low ration of 1.5-fold and in addition, moisture impermeability increases greatly after the rolling.

A monoaxially oriented packaging material of this invention can include one or more layers of different resin in addition to the foregoing structure composed of a polyamide resin layer and other thermoplastic resin layer(s). For example, an adhesive resin layer can be added in order to join the polyamide resin layer and other thermoplastic resin layer, or a sealant resin layer for packaging bags. Desirable ones as these additional resin layers are essentially crystalline resins. If the additional resin can be oriented by stretching, it does not have any influence on the tearability with a thickness like ordinary films for laminating, for example, 3 to 30 μm as an adhesive layer and 3 to 60 μm as a sealant layer.

With regard to the sealant layer, it is preferable to provide such a layer that has a melting point lower than the lowest melting point of all component resins, on either an innermost layer or an outermost layer of a multilayered packaging material that is composed of the foregoing polyamide resin and other thermoplastic resins. This is because the multilayered packaging material does not lose the characteristics such as stretched property in the processing after the formation of bags.

Co-extruded multilayered films made by coextrusion or multilayered materials made by dry lamination or else are used as the multilayered films to be stretched. Otherwise, each of the foregoing polyamide resin film and other thermoplastic resin film can be fed simultaneously and laminated in the process of stretching.

Exemplified as polyamide (PA) resins used for preparing the multilayered packaging material of this invention are Nylon 6, Nylon 66, Nylon 10, Nylon 12 and Nylon copolymer.

It is preferable to use nylon or its copolymer having a melting point below 240° C., especially when it is used in combination with a resin to be formed within a relatively narrow range of temperature such as ethylene-vinyl alcohol copolymer (EVOH).

As the other thermoplastic resins used in this invention, it is preferable to use inherently orientable resins, that is crystalline resins. Exemplified as these resins are polyolefin (PO) resins such as high density polyethylene (HDPE), linear low density polyethylene (LLDPE), polypropylene (PP) and polybutene-1; highly impermeable resins such as ethylene-vinyl alcohol copolymer (EVOH), polyvinylidene chloride (PVDC), polyacrylonitrile (PAN); polyester resins such as polyethyleneterephthalate (PET); and polystyrene (PSt) resins.

Exemplified as the adhesive resins are polyolefin resins having polar groups such as ionomers, copolymer of ethylene and unsaturated carboxylic acid or its derivative, polyolefin modified with unsaturated carboxylic acid such as maleic acid or its derivative and ethylene-vinyl acetate copolymer.

As the sealant resins, it is preferable to use polyolefin resins such as low density polyethylene, linear low density polyethylene, propylene-ethylene copolymer and ethylene-vinyl acetate copolymer. Furthermore, abovementioned orientable resins and adhesive resins may also be used for the sealant layer.

Exemplified as the combinations of these resins are PA/adhesive resin/HDPE, PA/adhesive resin/LLDPE, PA/adhesive resin/PP, PA/EVOH, PA/EVOH/adhesive resin/HDPE, PA/EVOH/adhesive resin/PP, PA/adhesive resin/PVDC/adhesive resin/HDPE, PA/adhesive resin/PAN/adhesive resin/HDPE, PA/adhesive resin/HDPE/LLDPE, HDPE/adhesive resin/PA/adhesive resin/HDPE and PP/adhesive resin/PA/adhesive resin/PP.

The method of production that is employed in this invention will be described in the following.

A producing method of the present invention comprises the step of a passing multilayered structure composed of at least two layers of a polyamide resin layer and other thermoplastic resin layer(s) through at least one pair of rolls in a heated state at temperatures in the range from the lowest melting point of component resins to a temperature lower than the melting point by 70° C., thereby monoaxially rolling the layered structure under pressure. The ratio of rolling (ratio of thickness before rolling to the thickness after rolling) is in the range of 1.5- to 7-fold. By this step, the thickness of the polyamide resin layer is made 3 to 30 μm and the thickness of other thermoplastic resin layer(s) is at least twice as large as that of the polyamide resin layer.

That is, the above rolling process is done by a most preferable method of rolling. It is important that the monoaxial rolling at a rolling ratio of 1.5- to 7.0-fold is carried out in the temperature range from the lowest melting point of the component resins to the temperature lower by 70° C. than that melting point.

When the rolling temperature is lower by more than 70° C. than the lowest melting point of component resins, not only the efficiency of rolling and transparency are impaired but also the necessary pressing force of rolls is increased and the rate of forming is reduced.

The above rolling method is exemplified by rolling, belt pressing and punch pressing. Most preferable one is rolling because it is operated continuously at high speed. The rolling is a method that passes the multilayered structure through at least one pair of rolls, thereby monoaxially orienting the layered structure by pressing force of pressing. Depending on rotating speed, constant-speed rolling and varied-speed rolling are known. The varied-speed rolling is preferable, because transparency and gas impermeability are improved under a relatively small pressure.

In order to improve the transparency, specular rolls are preferably used for orienting. The specular rolls are plated with hard chromium or the like. The surface roughness (JIS B 0601) of the rolls is not higher than 1 s, preferably lower than 0.8 s, and more preferably lower than 0.5 s.

A monoaxially oriented multilayered packaging material of this invention is composed of two or more layers of a polyamide resin layer and other thermoplastic resin layer(s), wherein the thicknesses of the resin layers are limited within the specific ranges, and furthermore, the material is oriented monoaxially in the specific conditions. As a result, the material has tearability in one direction as well as excellent piercing resistance which is characteristic of the polyamide resin. Still further, heat-sealed portions are not become creased when it is formed into bags by heat-sealing.

BEST METHOD FOR CARRYING OUT THE INVENTION

In the following, the present invention will be described in more detail with reference to experiments.

Experiment Example 1

A Nylon 6 (medium viscosity, specific gravity: 1.13, melting point: 225° C., trade name: AMILAN CM1021, made by Toray Industries, Inc.) was used as a polyamide resin, and a high density polyethylene (MFR: 1.0 g/10 min, density: 0.956 g/cm$^3$, trade name: NISSEKI Polyethylene E710, made by Nippon Petrochemicals Co., Ltd.) was used as another thermoplastic resin. Polyethylene modified with maleic acid (MFR: 0.8 g/10 min, density: 0.91 g/cm$^3$, trade name: NISSEKi N-Polymer L6033, made by Nippon Petrochemicals Co., Ltd.) was used as an adhesive resin. Triple-layered films having various thicknesses of layers were formed by co-extrusion method, and they are then oriented in various ratios at a rolling temperature of 110° C., using a rolling apparatus (roll length: 520 mm, length/diameter (L/D)=1.9, surface roughness: 0.2 s and 1 s). Properties of the obtained films were tested and results are shown in the following Table 1.

Experiment Example 2

A Nylon copolymer (higher-medium viscosity, specific gravity: 1.13, melting point: 200° C., trade name: AMILAN CM6041, made by Toray Industries Inc.) was used as a polyamide resin, and polypropylene (MFR: 0.5 g/10min, density: 0.91 g/cm$^3$, trade name: NISSEKI Polypro E110G, made by Nippon Petrochemicals Co., Ltd.) was used as another thermoplastic resin. A polypropylene modified with maleic acid (MFR: 7.5 g/10 min, density: 0.91 g/cm$^3$, trade name: NISSEKI N-Polymer P4070, made by Nippon Petrochemicals Co., Ltd.) was used as an adhesive resin. Triple-layered films having various thicknesses were formed by co-extrusion method, and they were then oriented at various ratios at a rolling temperature of 135° C. by using the same rolling apparatus as used in Experiment Example 1. Properties of the obtained films were tested and the results are shown in Table 2.

TABLE 1

| No. | Thickness Constitution of Layers (μm) | Ratio of Rolling (—) | Piercing Resistance JAS Method (g) | Tearing Properties Tearing Resistance (g) | Tearability | Appearance of Bag Creases in Heat-Sealed Portion | Transparency (Haze %) Roughness of Roll Surface 0.2 s | 1 s |
|---|---|---|---|---|---|---|---|---|
| | | | <Experiment Example 1> | | | | | |
| | PA/Adhes./HDPE | | | | | | | |
| 1 | 10/5/20 | 1.3 | 510 | 288 | X | O | — | — |
| 2 | " | 2.0 | 530 | 153 | O | O | 3.1 | — |
| 3 | " | 5.0 | 700 | 96 | O | O | 2.3 | 6.2 |
| 4 | " | 7.5 | 850 | 75 | O | X | 2.2 | — |
| 5 | 15/5/15 | 3.0 | 550 | 496 | X | O | 2.5 | — |
| 6 | " | 6.0 | 810 | 352 | X | O | 2.3 | — |
| 7 | 35/5/75 | 5.0 | 1260 | 223 | X | O | 4.8 | — |

Note:
"Adhes." Adhesive Resin
"JAS Method" Method of Japanese Agriculture Standard
"Tearability" O: Good, X: Not good
"Creases in Heat-Sealed Portion" O: No crease, X: Creases observed

TABLE 2

| No. | Thickness Constitution of Layers (μm) | Ratio of Rolling (—) | Piercing Resistance JAS Method (g) | Tearing Properties Tearing Resistance (g) | Tearability | Appearance of Bag Creases in Heat-Sealed Portion | Transparency (Haze %) Roughness of Roll Surface 0.2 s | 1 s |
|---|---|---|---|---|---|---|---|---|
| | | | <Experiment Example 2> | | | | | |
| | PA/Adhes./PP | | | | | | | |
| 1 | 10/5/20 | 1.3 | 580 | 240 | X | O | — | — |
| 2 | " | 2.0 | 630 | 128 | O | O | 3.3 | — |
| 3 | " | 5.0 | 710 | 83 | O | O | 2.1 | 4.9 |
| 4 | " | 7.5 | 820 | 64 | O | X | 2.1 | — |
| 5 | 15/5/15 | 3.0 | 680 | 400 | X | O | 2.2 | — |
| 6 | " | 6.0 | 770 | 304 | X | O | 2.1 | |
| | | | <Experiment Example 3> | | | | | |
| | PA/EVOH | | | | | | | |
| 1 | 10/20 | 1.3 | 540 | 225 | X | — | — | — |
| 2 | " | 2.0 | 600 | 135 | O | — | 2.1 | — |
| 3 | " | 5.0 | 820 | 64 | O | — | 1.8 | 4.4 |
| 4 | " | 7.5 | 960 | 48 | O | — | 1.8 | — |
| 5 | 15/15 | 3.0 | 780 | 260 | X | — | 1.9 | — |
| 6 | " | 6.0 | 920 | 210 | X | — | 1.9 | — |

Note:
"Tearability" O: Good, X: Not good
"Creases in Heat-Sealed Portion" O: No crease, X: Creases observed

Experiment Example 3

A Nylon copolymer (higher-medium viscosity, specific gravity: 1.13, melting point: 200° C., trade name: AMILAN CM6041, made by Toray Industries, Inc.) was used as a polyamide resin, and an ethylene-vinyl alcohol copolymer (trade name: EVAL EP-F101, made by Kurarey Co., Ltd.). Double-layered films having various thicknesses were formed by co-extrusion method. They were then oriented in various ratios at a rolling temperature of 120° C., using a rolling apparatus (roll length: 520 mm, length/diameter (L/D)=1.9, surface roughness: 0.2s and 1 s). Properties of the obtained films were tested and the results are also shown in Table 2.

Experiment Example 4

Nylon 6 (medium viscosity, specific gravity: 1.13, melting point: 225° C., trade name: AMILAN CM1021, made by Toray Industries, Inc.) was used as a polyamide resin, and high density polyethylene (MFR: 1.0 g/10 min, density: 0.956 g/cm³, trade name: NISSEKI Polyethylene E710, made by Nippon Petrochemicals Co., Ltd.) was used as another thermoplastic resin. A polyethylene modified with maleic acid (MFR: 0.8 g/10 min, density: 0.91 g/cm³, trade name: NISSEKI N-Polymer L6033, made by Nippon Petrochemicals Co., Ltd.) was used as an adhesive resin, and furthermore a linear low density polyethylene (density: 0.935 g/cm³, MFR: 2.0 g/10 min, melting point: 126° C., trade name: NISSEKI LINIREX AF3710, made by Nippon Petrochemicals Co., Ltd.) was used as a sealant layer. Quadruple-layered films having layers of various thicknesses were formed by co-extrusion method, and they were then oriented in various ratios at a rolling temperature of 110° C., by using a rolling apparatus (roll length: 520 mm, length/diameter (L/D)=1.9, surface roughness: 0.2 s and 1 s). Properties of the obtained films were tested and the results are shown in Table 3.

Experiment Example 5

For comparison, single layer films having thicknesses of 10 μm and 30 μm were formed with Nylon 6 (medium viscosity, specific gravity: 1.13, melting point: 225° C., trade name: AMILAN CM1021, made by Toray Industries, Inc.) and they were oriented by using the same rolling apparatus as that used in Experiment Example 1. Properties of the oriented films are shown in Table 3.

TABLE 3

| No. | Thickness Constitution of Layers (μm) | Ratio of Rolling (—) | Piercing Resistance JAS Method (g) | Tearing Properties — Tearing Resistance (g) | Tearing Properties — Tearability | Appearance of Bag Creases in Heat-Sealed Portion | Transparency (Haze %) Roughness of Roll Surface 0.2 s | Transparency (Haze %) Roughness of Roll Surface 1 s |
|---|---|---|---|---|---|---|---|---|
| | PA/Adhes./HD/LL | | | | | | | |
| | | | | <Experiment Example 4> | | | | |
| 1 | 20/5/40/50 | 1.3 | 1030 | 430 | X | O | — | — |
| 2 | " | 2.0 | 1050 | 187 | O | O | 5.6 | — |
| 3 | " | 5.0 | 1110 | 128 | O | O | 4.2 | 8.8 |
| 4 | " | 7.5 | 1180 | 112 | O | X | 4.0 | — |
| 5 | 30/5/30/50 | 3.0 | 1120 | 480 | X | O | 4.8 | — |
| 6 | " | 6.0 | 1250 | 314 | X | O | 4.3 | — |
| | | | | <Experiment Example 5> | | | | |
| | PA (Single layer) | | | | | | | |
| 1 | 10 | 5.0 | 650 | 286 | X | — | 1.5 | — |
| 2 | 30 | 7.0 | 1110 | 257 | X | — | 1.8 | 4.1 |

Note:
"Thickness Constitution of Layers" HD: Abbreviation of HDPE, LL: LLDPE.
"Tearability" O: Good, X: Not good
"Creases in Heat-Sealed Portion" O: No crease, X: Crease observed

INDUSTRIAL APPLICABILITY

A multilayered packaging material of this invention is excellent in tearability, gas impermeability and so forth, and it can be used efficiently for food packaging, especially for making bags. In the case of packaging the articles having hard and sharp edges such as meat with bones, polyamide resins have been widely used, because they are characterized by high piercing resistance and film strength. In such a case, a multilayered packaging material of this invention can be used as bags which are excellent in easiness in opening owing to its tearability in a single direction as well as its excellent piercing resistance.

In the case of packages of liquids such as sauces and soups, it is necessary to take care to avoid staining clothes with the liquid when opening containers. Especially, for old people and children, it was difficult to open the bags made of conventional materials. In such a case, the packaging material according to the present invention can also be used conveniently.

We claim:

1. A monoaxially oriented multilayered packaging material obtained by the steps comprising passing a multilayered structure including one polyamide resin layer and another thermoplastic layer through at least one pair of rolls such that the ratio of the thickness of said structure before rolling to the thickness after rolling is 1.5:1 to 7.0:1, wherein the thickness of the polyamide resin layer is 3 to 30 μm and the thickness of the other thermoplastic resin layer is at least twice that of the polyamide resin layer.

2. The monoaxially oriented multilayered packaging material as claimed in claim 1 wherein said other thermoplastic resin layer is a layer formed of a thermoplastic selected from the group consisting of high density polyethylene, linear low density polyethylene, polypropylene, an ethylene-vinyl alcohol copolymer, polyvinylidene chloride, polyacrylonitrile, a polyester resin and polystyrene.

3. The monoaxially oriented multilayered packaging material as claimed claim 1 or claim 2 wherein a sealant layer having a melting point lower than the melting point of the resins of said multilayered structure is provided on either outside layer of the multilayered packaging material.

4. A method of producing a monoaxially oriented multilayered packaging material which comprises passing a multilayered structure composed of a polyamide resin layer, another thermoplastic layer and a sealant layer in that order, the sealant layer having the lowest melting point of all component resins, through at lest one pair of rolls, which are heated to a temperature in the range of from below the melting point of the sealant layer resin to 70° C. lower than the melting point of the sealant layer resin, such that the ratio of the thickness of said multilayered structure before rolling to its thickness after rolling is 1.5:1 to 7.0:1, wherein the thickness of the polyamide resin layer is 3 to 30 microns and the thickness of said another thermoplastic layer is at least twice that of the polyamide resin layer.

5. The method as claimed in claim 4 wherein the surface roughness of the rolls used in said step of passing said multilayered structure through at least one pair of rolls is, in accordance with JIS B 0601, no greater than 1 s.

6. The method as claimed in claim 4 or claim 5 wherein said another thermoplastic layer is formed of a thermoplastic resin selected from the group consisting of high density polyethylene, linear low density polyethylene, polypropylene, polybutene-1, an ethylene-vinyl alcohol copolymer, polyvinylidene chloride, polyacrylonitrile, a polyester resin and polystyrene.

* * * * *

UNITED STATES PATENT AND TRADEMARK OFFICE
CERTIFICATE OF CORRECTION

PATENT NO. : 5,348,794
DATED : September 20, 1994
INVENTOR(S) : Tomonori Takahashi, et al.

It is certified that error appears in the above-indentified patent and that said Letters Patent is hereby corrected as shown below:

Column 1, line 66: "7-fold" should read --7.0-fold--

Column 4, line 3: "abovementioned" should read --above-mentioned--

Column 4, line 26: "7-fold" should read --7.0-fold--

Column 5, line 16: "NISSEKi" should read --NISSEKI--

Column 8, line 50, Claim 1: after "including" insert --at least--

Column 8, line 67, Claim 3: after "claimed" insert --in--

UNITED STATES PATENT AND TRADEMARK OFFICE
CERTIFICATE OF CORRECTION

PATENT NO. : 5,348,794

DATED : September 20, 1994

INVENTOR(S) : Tomonori Takahashi, et al.

It is certified that error appears in the above-indentified patent and that said Letters Patent is hereby corrected as shown below:

Column 9, line 9, Claim 4: "least" should read --least--.

Signed and Sealed this

Twentieth Day of June, 1995

Attest:

BRUCE LEHMAN

*Attesting Officer*      *Commissioner of Patents and Trademarks*